(12) United States Patent  
Boyle et al.

(10) Patent No.: US 9,063,838 B1  
(45) Date of Patent: Jun. 23, 2015

(54) DATA STORAGE DEVICE SHIFTING DATA CHUNKS OF ALIGNMENT ZONE RELATIVE TO SECTOR BOUNDARIES

(75) Inventors: William B. Boyle, Lake Forest, CA (US); Kai Ling Lee, Shah Alam (MY); Sang Huynh, Yorba Linda, CA (US); Ayberk Ozturk, Irvine, CA (US); Billy Rickey, Newport Beach, CA (US); Aznizam Abdullah Salehudin, Bandar Baru Bangi (MY); Robert M. Fallone, Newport Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 146 days.

(21) Appl. No.: 13/356,542

(22) Filed: Jan. 23, 2012

(51) Int. Cl.  
*G06F 12/02* (2006.01)  
*G06F 9/30* (2006.01)

(52) U.S. Cl.  
CPC ............ *G06F 12/02* (2013.01); *G06F 9/30032* (2013.01)

(58) Field of Classification Search  
CPC ..... G06F 12/02; G06F 12/0246; G06F 3/064; G06F 3/0607; G06F 3/0613; G06F 3/0644  
USPC .................. 711/162, 165, 170, 201, 202, 219  
See application file for complete search history.

(56) References Cited

U.S. PATENT DOCUMENTS

| | | | |
|---|---|---|---|
| 5,325,526 A | 6/1994 | Cameron et al. | |
| 5,613,066 A | 3/1997 | Matsushima et al. | |
| 5,675,769 A * | 10/1997 | Ruff et al. | 711/173 |
| 5,813,025 A | 9/1998 | Murphy et al. | |
| 5,822,142 A * | 10/1998 | Hicken | 360/53 |
| 6,018,789 A | 1/2000 | Sokolov et al. | |
| 6,035,351 A | 3/2000 | Billings et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,092,231 A | 7/2000 | Sze | |
| 6,094,707 A | 7/2000 | Sokolov et al. | |
| 6,105,104 A | 8/2000 | Guttmann et al. | |
| 6,111,717 A | 8/2000 | Cloke et al. | |

(Continued)

FOREIGN PATENT DOCUMENTS

CN 1258913 A 7/2000  
WO 2011062861 5/2011

OTHER PUBLICATIONS

Di Marco, Alessandro. "Exploiting commodity hard-disk geometry to efficiently preserve data consistency." Formal Methods and Stochastic Models for Performance Evaluation. Springer Berlin Heidelberg, 2007. 260-274.*

(Continued)

*Primary Examiner* — Aimee Li  
*Assistant Examiner* — Alvaro R Calderon, IV (57) ABSTRACT

A data storage device is disclosed comprising a non-volatile memory comprising a plurality of sectors. At least one alignment zone is defined in the non-volatile memory comprising a plurality of chunks including a plurality of data chunks and a plurality of pad chunks, wherein each chunk comprises a plurality of sectors. Each sector is operable to store X host blocks, the alignment zone comprises at least X−1 pad chunks, and control circuitry is operable to shift the data chunks of the alignment zone by a number of chunks equal to or less than X−1 plus a corresponding offset.

20 Claims, 5 Drawing Sheets

(56) References Cited

U.S. PATENT DOCUMENTS

| | | | |
|---|---|---|---|
| 6,112,277 A | 8/2000 | Bui et al. | |
| 6,125,435 A * | 9/2000 | Estakhri et al. | 711/201 |
| 6,145,052 A | 11/2000 | Howe et al. | |
| 6,175,686 B1 | 1/2001 | Noda | |
| 6,175,893 B1 | 1/2001 | D'Souza et al. | |
| 6,178,056 B1 | 1/2001 | Cloke et al. | |
| 6,178,487 B1 * | 1/2001 | Ruff et al. | 711/165 |
| 6,185,666 B1 * | 2/2001 | Murray et al. | 711/173 |
| 6,191,712 B1 | 2/2001 | Still | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,324,604 B1 * | 11/2001 | Don et al. | 710/74 |
| 6,327,106 B1 | 12/2001 | Rothberg | |
| 6,337,778 B1 | 1/2002 | Gagne | |
| 6,369,969 B1 | 4/2002 | Christiansen et al. | |
| 6,384,999 B1 | 5/2002 | Schibilla | |
| 6,385,711 B1 | 5/2002 | Colligan | |
| 6,388,833 B1 | 5/2002 | Golowka et al. | |
| 6,405,342 B1 | 6/2002 | Lee | |
| 6,408,357 B1 | 6/2002 | Hanmann et al. | |
| 6,408,406 B1 | 6/2002 | Parris | |
| 6,411,452 B1 | 6/2002 | Cloke | |
| 6,411,458 B1 | 6/2002 | Billings et al. | |
| 6,412,083 B1 | 6/2002 | Rothberg et al. | |
| 6,415,349 B1 | 7/2002 | Hull et al. | |
| 6,425,128 B1 | 7/2002 | Krapf et al. | |
| 6,441,981 B1 | 8/2002 | Cloke et al. | |
| 6,442,328 B1 | 8/2002 | Elliott et al. | |
| 6,445,524 B1 | 9/2002 | Nazarian et al. | |
| 6,449,767 B1 | 9/2002 | Krapf et al. | |
| 6,453,115 B1 | 9/2002 | Boyle | |
| 6,453,383 B1 * | 9/2002 | Stoddard et al. | 711/112 |
| 6,470,420 B1 | 10/2002 | Hospodor | |
| 6,480,020 B1 | 11/2002 | Jung et al. | |
| 6,480,349 B1 | 11/2002 | Kim et al. | |
| 6,480,932 B1 | 11/2002 | Vallis et al. | |
| 6,483,986 B1 | 11/2002 | Krapf | |
| 6,487,032 B1 | 11/2002 | Cloke et al. | |
| 6,490,635 B1 | 12/2002 | Holmes | |
| 6,493,173 B1 | 12/2002 | Kim et al. | |
| 6,499,083 B1 | 12/2002 | Hamlin | |
| 6,519,104 B1 | 2/2003 | Cloke et al. | |
| 6,525,892 B1 | 2/2003 | Dunbar et al. | |
| 6,532,517 B1 | 3/2003 | Wagner et al. | |
| 6,545,830 B1 | 4/2003 | Briggs et al. | |
| 6,546,489 B1 | 4/2003 | Frank, Jr. et al. | |
| 6,550,021 B1 | 4/2003 | Dalphy et al. | |
| 6,552,880 B1 | 4/2003 | Dunbar et al. | |
| 6,553,457 B1 | 4/2003 | Wilkins et al. | |
| 6,578,106 B1 | 6/2003 | Price | |
| 6,580,573 B1 | 6/2003 | Hull et al. | |
| 6,594,183 B1 | 7/2003 | Lofgren et al. | |
| 6,600,620 B1 | 7/2003 | Krounbi et al. | |
| 6,601,137 B1 | 7/2003 | Castro et al. | |
| 6,603,622 B1 | 8/2003 | Christiansen et al. | |
| 6,603,625 B1 | 8/2003 | Hospodor et al. | |
| 6,604,220 B1 | 8/2003 | Lee | |
| 6,606,682 B1 | 8/2003 | Dang et al. | |
| 6,606,714 B1 | 8/2003 | Thelin | |
| 6,606,717 B1 | 8/2003 | Yu et al. | |
| 6,611,393 B1 | 8/2003 | Nguyen et al. | |
| 6,615,312 B1 | 9/2003 | Hamlin et al. | |
| 6,639,748 B1 | 10/2003 | Christiansen et al. | |
| 6,647,481 B1 | 11/2003 | Luu et al. | |
| 6,654,193 B1 | 11/2003 | Thelin | |
| 6,657,810 B1 | 12/2003 | Kupferman | |
| 6,661,591 B1 | 12/2003 | Rothberg | |
| 6,665,772 B1 | 12/2003 | Hamlin | |
| 6,687,073 B1 | 2/2004 | Kupferman | |
| 6,687,078 B1 | 2/2004 | Kim | |
| 6,687,850 B1 | 2/2004 | Rothberg | |
| 6,690,523 B1 | 2/2004 | Nguyen et al. | |
| 6,690,882 B1 | 2/2004 | Hanmann et al. | |
| 6,691,198 B1 | 2/2004 | Hamlin | |
| 6,691,213 B1 | 2/2004 | Luu et al. | |
| 6,691,255 B1 | 2/2004 | Rothberg et al. | |
| 6,693,760 B1 | 2/2004 | Krounbi et al. | |
| 6,694,477 B1 | 2/2004 | Lee | |
| 6,697,914 B1 | 2/2004 | Hospodor et al. | |
| 6,704,153 B1 | 3/2004 | Rothberg et al. | |
| 6,708,251 B1 | 3/2004 | Boyle et al. | |
| 6,710,951 B1 | 3/2004 | Cloke | |
| 6,711,628 B1 | 3/2004 | Thelin | |
| 6,711,635 B1 | 3/2004 | Wang | |
| 6,711,660 B1 | 3/2004 | Milne et al. | |
| 6,715,044 B2 | 3/2004 | Lofgren et al. | |
| RE38,502 E | 4/2004 | Yonemitsu | |
| 6,724,982 B1 | 4/2004 | Hamlin | |
| 6,725,329 B1 | 4/2004 | Ng et al. | |
| 6,735,650 B1 | 5/2004 | Rothberg | |
| 6,735,693 B1 | 5/2004 | Hamlin | |
| 6,744,772 B1 | 6/2004 | Eneboe et al. | |
| 6,745,283 B1 | 6/2004 | Dang | |
| 6,751,402 B1 | 6/2004 | Elliott et al. | |
| 6,751,686 B2 | 6/2004 | Takasugi et al. | |
| 6,757,481 B1 | 6/2004 | Nazarian et al. | |
| 6,772,281 B2 | 8/2004 | Hamlin | |
| 6,781,826 B1 | 8/2004 | Goldstone et al. | |
| 6,782,449 B1 | 8/2004 | Codilian et al. | |
| 6,791,779 B1 | 9/2004 | Singh et al. | |
| 6,792,486 B1 | 9/2004 | Hanan et al. | |
| 6,799,274 B1 | 9/2004 | Hamlin | |
| 6,811,427 B2 | 11/2004 | Garrett et al. | |
| 6,826,003 B1 | 11/2004 | Subrahmanyam | |
| 6,826,614 B1 | 11/2004 | Hanmann et al. | |
| 6,832,041 B1 | 12/2004 | Boyle | |
| 6,832,929 B2 | 12/2004 | Garrett et al. | |
| 6,845,405 B1 | 1/2005 | Thelin | |
| 6,845,427 B1 | 1/2005 | Atai-Azimi | |
| 6,850,443 B2 | 2/2005 | Lofgren et al. | |
| 6,851,055 B1 | 2/2005 | Boyle et al. | |
| 6,851,063 B1 | 2/2005 | Boyle et al. | |
| 6,853,731 B1 | 2/2005 | Boyle et al. | |
| 6,854,022 B1 | 2/2005 | Thelin | |
| 6,862,660 B1 | 3/2005 | Wilkins et al. | |
| 6,880,043 B1 | 4/2005 | Castro et al. | |
| 6,882,486 B1 | 4/2005 | Kupferman | |
| 6,884,085 B1 | 4/2005 | Goldstone | |
| 6,888,831 B1 | 5/2005 | Hospodor et al. | |
| 6,892,217 B1 | 5/2005 | Hanmann et al. | |
| 6,892,249 B1 | 5/2005 | Codilian et al. | |
| 6,892,313 B1 | 5/2005 | Codilian et al. | |
| 6,895,455 B1 | 5/2005 | Rothberg | |
| 6,895,500 B1 | 5/2005 | Rothberg | |
| 6,898,730 B1 | 5/2005 | Hanan | |
| 6,910,099 B1 | 6/2005 | Wang et al. | |
| 6,928,470 B1 | 8/2005 | Hamlin | |
| 6,931,439 B1 | 8/2005 | Hanmann et al. | |
| 6,934,104 B1 | 8/2005 | Kupferman | |
| 6,934,713 B2 | 8/2005 | Schwartz et al. | |
| 6,940,873 B2 | 9/2005 | Boyle et al. | |
| 6,943,978 B1 | 9/2005 | Lee | |
| 6,948,165 B1 | 9/2005 | Luu et al. | |
| 6,950,267 B1 | 9/2005 | Liu et al. | |
| 6,954,733 B1 | 10/2005 | Ellis et al. | |
| 6,961,814 B1 | 11/2005 | Thelin et al. | |
| 6,965,489 B1 | 11/2005 | Lee et al. | |
| 6,965,563 B1 | 11/2005 | Hospodor et al. | |

(56) References Cited

U.S. PATENT DOCUMENTS

| | | |
|---|---|---|
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,988,178 B1 | 1/2006 | Shirai et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,603 B1 | 7/2006 | Chheda |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,099,993 B2 | 8/2006 | Keeler |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,117 B2 | 2/2008 | Ferguson et al. |
| 7,330,323 B1 | 2/2008 | Singh et al. |
| 7,330,417 B2 | 2/2008 | Billau et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,395,404 B2 * | 7/2008 | Gorobets et al. ............ 711/201 |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,461,202 B2 | 12/2008 | Forrer, Jr. et al. |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,574,558 B2 | 8/2009 | Morley et al. |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |

(56) References Cited

U.S. PATENT DOCUMENTS

| | | | |
|---|---|---|---|
| 7,990,648 B1 | 8/2011 | Wang | |
| 7,992,179 B1 | 8/2011 | Kapner, III et al. | |
| 8,004,785 B1 | 8/2011 | Tsai et al. | |
| 8,006,027 B1 | 8/2011 | Stevens et al. | |
| 8,014,094 B1 | 9/2011 | Jin | |
| 8,014,977 B1 | 9/2011 | Masiewicz et al. | |
| 8,019,914 B1 | 9/2011 | Vasquez et al. | |
| 8,040,625 B1 | 10/2011 | Boyle et al. | |
| 8,046,533 B2 | 10/2011 | Kompella et al. | |
| 8,051,044 B1* | 11/2011 | Dyatlov et al. | 707/646 |
| 8,055,842 B1 | 11/2011 | Iyer | |
| 8,078,943 B1 | 12/2011 | Lee | |
| 8,079,045 B2 | 12/2011 | Krapf et al. | |
| 8,082,433 B1 | 12/2011 | Fallone et al. | |
| 8,085,487 B1 | 12/2011 | Jung et al. | |
| 8,089,719 B1 | 1/2012 | Dakroub | |
| 8,090,902 B1 | 1/2012 | Bennett et al. | |
| 8,090,906 B1 | 1/2012 | Blaha et al. | |
| 8,091,112 B1 | 1/2012 | Elliott et al. | |
| 8,094,396 B1 | 1/2012 | Zhang et al. | |
| 8,094,401 B1 | 1/2012 | Peng et al. | |
| 8,116,020 B1 | 2/2012 | Lee | |
| 8,116,025 B1 | 2/2012 | Chan et al. | |
| 8,134,793 B1 | 3/2012 | Vasquez et al. | |
| 8,134,798 B1 | 3/2012 | Thelin et al. | |
| 8,139,301 B1 | 3/2012 | Li et al. | |
| 8,139,310 B1 | 3/2012 | Hogg | |
| 8,144,419 B1 | 3/2012 | Liu | |
| 8,145,452 B1 | 3/2012 | Masiewicz et al. | |
| 8,149,528 B1 | 4/2012 | Suratman et al. | |
| 8,154,812 B1 | 4/2012 | Boyle et al. | |
| 8,159,768 B1 | 4/2012 | Miyamura | |
| 8,161,328 B1 | 4/2012 | Wilshire | |
| 8,164,849 B1 | 4/2012 | Szeremeta et al. | |
| 8,174,780 B1 | 5/2012 | Tsai et al. | |
| 8,190,575 B1 | 5/2012 | Ong et al. | |
| 8,194,338 B1 | 6/2012 | Zhang | |
| 8,194,340 B1 | 6/2012 | Boyle et al. | |
| 8,194,341 B1 | 6/2012 | Boyle | |
| 8,201,066 B1 | 6/2012 | Wang | |
| 8,271,692 B1 | 9/2012 | Dinh et al. | |
| 8,279,550 B1 | 10/2012 | Hogg | |
| 8,281,218 B1 | 10/2012 | Ybarra et al. | |
| 8,285,923 B2 | 10/2012 | Stevens | |
| 8,285,965 B2 | 10/2012 | Karr et al. | |
| 8,289,656 B1 | 10/2012 | Huber | |
| 8,305,705 B1 | 11/2012 | Roohr | |
| 8,307,156 B1 | 11/2012 | Codilian et al. | |
| 8,310,775 B1 | 11/2012 | Boguslawski et al. | |
| 8,315,006 B1 | 11/2012 | Chahwan et al. | |
| 8,316,263 B1 | 11/2012 | Gough et al. | |
| 8,320,067 B1 | 11/2012 | Tsai et al. | |
| 8,324,974 B1 | 12/2012 | Bennett | |
| 8,332,695 B2 | 12/2012 | Dalphy et al. | |
| 8,341,337 B1 | 12/2012 | Ong et al. | |
| 8,350,628 B1 | 1/2013 | Bennett | |
| 8,356,184 B1 | 1/2013 | Meyer et al. | |
| 8,370,683 B1 | 2/2013 | Ryan et al. | |
| 8,375,225 B1 | 2/2013 | Ybarra | |
| 8,375,274 B1 | 2/2013 | Bonke | |
| 8,380,922 B1 | 2/2013 | DeForest et al. | |
| 8,390,948 B2 | 3/2013 | Hogg | |
| 8,390,952 B1 | 3/2013 | Szeremeta | |
| 8,392,689 B1 | 3/2013 | Lott | |
| 8,407,393 B1 | 3/2013 | Yolar et al. | |
| 8,413,010 B1 | 4/2013 | Vasquez et al. | |
| 8,417,566 B2 | 4/2013 | Price et al. | |
| 8,421,663 B1 | 4/2013 | Bennett | |
| 8,422,172 B1 | 4/2013 | Dakroub et al. | |
| 8,427,771 B1 | 4/2013 | Tsai | |
| 8,429,343 B1 | 4/2013 | Tsai | |
| 8,433,937 B1 | 4/2013 | Wheelock et al. | |
| 8,433,977 B1 | 4/2013 | Vasquez et al. | |
| 8,458,526 B2 | 6/2013 | Dalphy et al. | |
| 8,462,466 B2 | 6/2013 | Huber | |
| 8,467,151 B1 | 6/2013 | Huber | |
| 8,489,841 B1 | 7/2013 | Strecke et al. | |
| 8,493,679 B1 | 7/2013 | Boguslawski et al. | |
| 8,495,289 B2* | 7/2013 | Moyer | 711/112 |
| 8,498,074 B1 | 7/2013 | Mobley et al. | |
| 8,499,198 B1 | 7/2013 | Messenger et al. | |
| 8,512,049 B1 | 8/2013 | Huber et al. | |
| 8,514,506 B1 | 8/2013 | Li et al. | |
| 8,531,791 B1 | 9/2013 | Reid et al. | |
| 8,554,741 B1 | 10/2013 | Malina | |
| 8,560,759 B1 | 10/2013 | Boyle et al. | |
| 8,565,053 B1 | 10/2013 | Chung | |
| 8,576,511 B1 | 11/2013 | Coker et al. | |
| 8,578,100 B1 | 11/2013 | Huynh et al. | |
| 8,578,126 B1* | 11/2013 | Gaonkar et al. | 711/201 |
| 8,578,242 B1 | 11/2013 | Burton et al. | |
| 8,589,773 B1 | 11/2013 | Wang et al. | |
| 8,593,753 B1 | 11/2013 | Anderson | |
| 8,595,432 B1 | 11/2013 | Vinson et al. | |
| 8,599,510 B1 | 12/2013 | Fallone | |
| 8,601,248 B2 | 12/2013 | Thorsted | |
| 8,611,032 B2 | 12/2013 | Champion et al. | |
| 8,612,650 B1 | 12/2013 | Carrie et al. | |
| 8,612,706 B1 | 12/2013 | Madril et al. | |
| 8,612,798 B1 | 12/2013 | Tsai | |
| 8,619,383 B1 | 12/2013 | Jung et al. | |
| 8,621,115 B1 | 12/2013 | Bombet et al. | |
| 8,621,133 B1 | 12/2013 | Boyle | |
| 8,626,463 B2 | 1/2014 | Stevens et al. | |
| 8,630,052 B1 | 1/2014 | Jung et al. | |
| 8,630,056 B1 | 1/2014 | Ong | |
| 8,631,188 B1 | 1/2014 | Heath et al. | |
| 8,634,158 B1 | 1/2014 | Chahwan et al. | |
| 8,635,412 B1 | 1/2014 | Wilshire | |
| 8,640,007 B1 | 1/2014 | Schulze | |
| 8,654,619 B1 | 2/2014 | Cheng | |
| 8,661,193 B1 | 2/2014 | Cobos et al. | |
| 8,667,248 B1 | 3/2014 | Neppalli | |
| 8,670,205 B1 | 3/2014 | Malina et al. | |
| 8,683,295 B1 | 3/2014 | Syu et al. | |
| 8,683,457 B1 | 3/2014 | Hughes et al. | |
| 8,687,306 B1 | 4/2014 | Coker et al. | |
| 8,693,133 B1 | 4/2014 | Lee et al. | |
| 8,694,841 B1 | 4/2014 | Chung et al. | |
| 8,699,159 B1 | 4/2014 | Malina | |
| 8,699,171 B1 | 4/2014 | Boyle | |
| 8,699,172 B1 | 4/2014 | Gunderson et al. | |
| 8,699,175 B1 | 4/2014 | Olds et al. | |
| 8,699,185 B1 | 4/2014 | Teh et al. | |
| 8,700,850 B1 | 4/2014 | Lalouette | |
| 8,743,502 B1 | 6/2014 | Bonke et al. | |
| 8,749,910 B1 | 6/2014 | Dang et al. | |
| 8,751,699 B1 | 6/2014 | Tsai et al. | |
| 8,755,141 B1 | 6/2014 | Dang | |
| 8,755,143 B2 | 6/2014 | Wilson et al. | |
| 8,756,361 B1 | 6/2014 | Pruett et al. | |
| 8,756,382 B1 | 6/2014 | Carlson et al. | |
| 8,769,593 B1 | 7/2014 | Elliott et al. | |
| 8,773,802 B1 | 7/2014 | Anderson et al. | |
| 8,780,478 B1 | 7/2014 | Huynh et al. | |
| 8,782,334 B1 | 7/2014 | Boyle et al. | |
| 8,793,532 B1 | 7/2014 | Tsai et al. | |
| 8,797,669 B1 | 8/2014 | Burton et al. | |
| 8,799,977 B1 | 8/2014 | Kapner, III et al. | |
| 2004/0019718 A1 | 1/2004 | Schauer et al. | |
| 2004/0255093 A1 | 12/2004 | Forrer, Jr. et al. | |
| 2005/0036381 A1 | 2/2005 | Hassner et al. | |
| 2005/0071583 A1* | 3/2005 | Shepherd | 711/154 |
| 2005/0125614 A1* | 6/2005 | Royer | 711/137 |
| 2005/0210214 A1* | 9/2005 | Takase et al. | 711/165 |
| 2006/0136655 A1 | 6/2006 | Gorobets et al. | 711/103 |
| 2007/0076936 A1* | 4/2007 | Li et al. | 382/129 |
| 2007/0079305 A1 | 4/2007 | Duerinckx | 717/151 |
| 2007/0143561 A1 | 6/2007 | Gorobets | |
| 2007/0192533 A1 | 8/2007 | Kim et al. | |
| 2008/0016275 A1* | 1/2008 | Sebastian et al. | 711/114 |
| 2008/0028162 A1* | 1/2008 | Thompson | 711/154 |
| 2008/0162811 A1* | 7/2008 | Steinmetz et al. | 711/114 |
| 2009/0031089 A1* | 1/2009 | Tuominen | 711/149 |

(56) References Cited

U.S. PATENT DOCUMENTS

| | | | |
|---|---|---|---|
| 2009/0070518 A1* | 3/2009 | Traister et al. | 711/103 |
| 2009/0106210 A1* | 4/2009 | Slezak et al. | 707/3 |
| 2009/0113702 A1 | 5/2009 | Hogg | |
| 2009/0228744 A1* | 9/2009 | Deenadhayalan et al. | 714/48 |
| 2009/0271562 A1* | 10/2009 | Sinclair | 711/103 |
| 2009/0276662 A1* | 11/2009 | Shen et al. | 714/19 |
| 2009/0313426 A1 | 12/2009 | See et al. | |
| 2010/0232049 A1* | 9/2010 | Kompella et al. | 360/55 |
| 2010/0306551 A1 | 12/2010 | Meyer et al. | |
| 2011/0047347 A1* | 2/2011 | Li et al. | 711/209 |
| 2011/0125977 A1* | 5/2011 | Karr et al. | 711/162 |
| 2011/0226729 A1 | 9/2011 | Hogg | |
| 2012/0159042 A1 | 6/2012 | Lott et al. | |
| 2012/0272038 A1* | 10/2012 | Wei et al. | 711/206 |
| 2012/0275050 A1 | 11/2012 | Wilson et al. | |
| 2012/0281963 A1 | 11/2012 | Krapf et al. | |
| 2012/0324980 A1 | 12/2012 | Nguyen et al. | |
| 2013/0326170 A1* | 12/2013 | Kilari et al. | 711/161 |
| 2014/0068152 A1* | 3/2014 | Sinclair | 711/103 |
| 2014/0201424 A1 | 7/2014 | Chen et al. | |

OTHER PUBLICATIONS

Paragon Software Group, "Partition Alignment Dramatically Increases System Performance", Jul. 5, 2010, http://dl.paragon-software.com/free/Paragon%20Alignment%20Tool/%20-%20White%20Paper.pdf.*

IDEMA, "Advanced Format Downloads", Apr. 24, 2012, www.idema.org.*

Seagate, "Tech Insight Transition to Advanced Format 4K Sector Hard Drives", Apr. 28, 2012, http://www.seagate.com/tech-insights/advanced-format-4k-sector-hard-drives-master-ti/.*

Wikipedia, "Advanced Format", Sep. 25, 2010, en.wikipedia.org/wiki/Advanced_Format.*

Coughlin, T., "Aligning with the Future of Storage", Jun. 2011, Coughlin Associates, Inc., www.tomcoughlin.com.*

Heo, T., "ATA 4 KiB sector issues", Mar. 13, 2010, ata.wiki.kernel.org/index.php/ATA_4_KiB_sector_issues.*

Dernoncourt, D., "Dealing with WD Advanced Format hard drives on Linux, Windows and Mac OS", Aug. 6, 2010, PCR's notepad.*

Smith, R., "Linux on 4KB-sector disks: Practical advice", Apr. 27, 2010, IBM.*

VMware, "Recommendations for Aligning VMFS Partitions", Feb. 4, 2009, VMware.*

Office Action dated Nov. 8, 2013 from U.S. Appl. No. 13/356,453, 36 pages.

Carl E. Bonke, et al., Patent Application U.S. Appl. No. 13/174,004, filed Jun. 30, 2011, 18 pages.

Notice of Allowance dated Jun. 20, 2014 from U.S. Appl. No. 13/356,453, 12 pages.

INCITS, "SCSI Block Commands—3 (SBC-3)", Revision 16, Aug. 25, 2008, American National Standards Institute, New York, New York, United States.

INCITS, "AT Attachment with Packet Interface—7 vol. 1—Register Delivered Command Set, Logical Register Set (ATA/ATAPI-7 V1)", Revision 4b, Apr. 21, 2004, American National Standards Institute, New York, New York, United States.

INCITS, "AT Attachment 8—ATA/ATAPI Command Set (ATA8-ACS)", Revision 4a, May 21, 2007, American National Standards Institute, New York, New York, United States.

Seagate Technology Paper, "SmartAlign Technology for Advanced Format Hard Drives", downloaded on Jul. 20, 2011 from www.seagate.com/docs/pdf/whitepaper/tp615_smartalign_for_af_4k.pdf.

Scott Errington, "OS and Application Considerations for Hard Disc Drives With Long Physical Sector Sizes", http://bigsector.net/user_img/Long_Physical_Sector_Sizes_PDF_version_02.pdf, Jan. 24, 2012.

"Seagate, ""Advanced Format 4K Sector Transition"", May 2010,http://www.seagate.com/docs/pdf/whitepaper/mb604_4k_transition_faq.pdf".

* cited by examiner

DATA STORAGE DEVICE SHIFTING DATA CHUNKS OF ALIGNMENT ZONE RELATIVE TO SECTOR BOUNDARIES

BACKGROUND

A data storage device (e.g., a disk drive or a solid state drive) comprises control circuitry and a non-volatile memory, such as a disk or a flash memory. The non-volatile memory comprises a plurality of memory segments referred to as sectors. To facilitate defect mapping, the sectors are accessed indirectly through logical block addresses (LBAs). In this manner, if a sector degrades, the system/user data can be relocated to a spare sector and the corresponding LBA(s) remapped to the spare sector.

The LBAs of a data storage device may be divided into a number of partitions, wherein each partition stores a file system (e.g., a n-bit FAT file system, or a NT File System) identifying system files and user files. A partition may be bootable meaning that it stores a bootable operating system (OS) such as Windows OS or Mac OS. When a computer system is initially powered on, a master boot record (MBR) is read from the data storage device (typically stored in the first logical data sector). The MBR identifies a partition table that stores a partition map for each partition of the data storage device. The partition table typically includes up to four primary partition maps identifying up to four primary partitions, wherein a primary partition may be further subdivided into extended partitions. Each partition map (primary and extended) identifies a starting LBA and ending LBA of the corresponding partition, a file system type field, and a flag indicating whether the partition is bootable. When the computer system finds a bootable partition, it uses the file system type field to access the partition's file system in order to read and execute the OS files from the partition (i.e., boot the computer system).

DETAILED DESCRIPTION OF EMBODIMENTS OF THE INVENTION

Figure 1A:
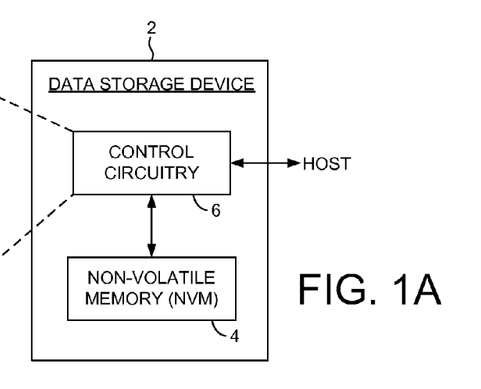
FIG. 1A shows a data storage device according to an embodiment of the present invention comprising control circuitry and a non-volatile memory comprising a plurality of sectors.
Figure 1B:
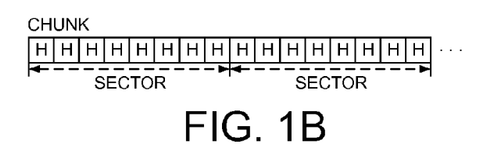
FIG. 1B shows an embodiment of the present invention wherein each sector stores eight host blocks, and a chunk is defined as comprises a plurality of sectors.

FIG. 1A shows a data storage device 2 according to an embodiment of the present invention comprising a non-volatile memory 4 comprising a plurality of sectors. The data storage device 2 further comprises control circuitry 6 operable to define at least one alignment zone in the non-volatile memory comprising a plurality of chunks including a plurality of data chunks and a plurality of pad chunks (an example is shown in FIG. 1D), wherein each chunk comprises a plurality of sectors. Each sector is operable to store X host blocks (an example is shown in FIG. 1B), the alignment zone comprises at least X−1 pad chunks, and the control circuitry 6 is operable to shift the data chunks of the alignment zone by a number of chunks equal to or less than X−1 plus a corresponding offset.

Figure 1C:
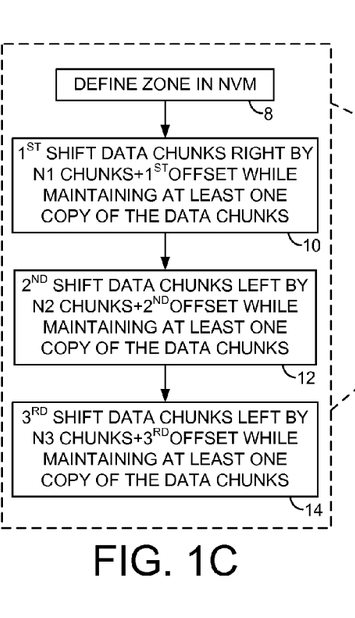
FIG. 1C is a flow diagram according to an embodiment of the present invention wherein at least one alignment zone in the non-volatile memory is defined as having a plurality of data chunks and pad chunks, wherein the pad chunks facilitate shifting the data chunks within the alignment zone.
Figure 1D:
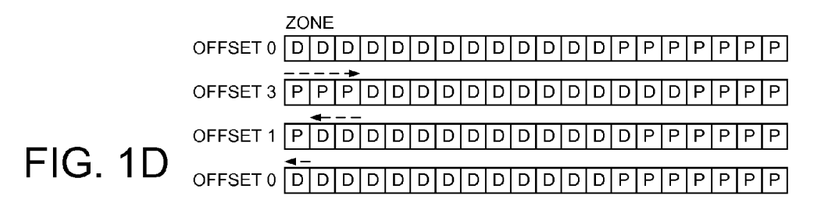
FIG. 1D illustrates an embodiment of the present invention wherein the data chunks of an alignment zone are shifted right by three chunks, then left by two chunks, then left by one chunk while maintaining a copy of the data chunks.

FIG. 1C is a flow diagram illustrating an embodiment of the present invention wherein after defining at least one alignment zone (step 8), the data chunks are first shifted right by N1 chunks (e.g., three chunks in FIG. 1D) plus a first offset while maintaining at least one copy of the data chunks (step 10). The data chunks are then second shifted left by N2 chunks (e.g., two chunks in FIG. 1D) plus a second offset while maintaining at least one copy of the data chunks (step 12), and then the data chunks are third shifted left by N3 chunks (e.g., one chunk in FIG. 1D) plus a third offset while maintaining at least one copy of the data chunks (step 14), wherein the first, second, and third offsets represent different fractions of a sector, and the first, second, and third shifts are consecutive.

In the embodiment of FIG. 1B, each sector of the non-volatile memory 4 stores eight host blocks, wherein a logical block address (LBA) maps each host block to a physical block address (PBA) of a sector. In order to write a sector, the control circuitry writes eight host blocks (eight LBAs) to the corresponding PBA. If the LBAs of a write command do not align with the boundary of a sector, the control circuitry reads the sector, modifies the sector data with the new data, and then writes the modified sector data (read-modify-write). The read-modify-write operations are undesirable since it reduces the performance of the data storage device.

A write command may be misaligned with the sectors of the non-volatile memory 4 due to a number of reasons, such as if a host defines a file based on an LBA range that does not align with the sector boundaries. In one embodiment, a host accesses the data storage device based on a plurality of partitions defined in the non-volatile memory. If the boundaries of the partitions do not align with the boundaries of a sector, it is more likely the LBAs of the host files will also not align with the sector boundaries, thereby increasing the number of read-modify-write operations. Accordingly in one embodiment when a misalignment of write commands with the sector boundaries is detected, the data chunks of an alignment zone are shifted by an offset that corresponds to the misalignment. In the embodiment of FIG. 1B, the write commands may be misaligned with the sector boundaries by an offset of zero, one, two, three, four, five, six or seven host blocks (LBAs). In the embodiments of the present invention, each sector may store any suitable number of host blocks (e.g., four host blocks) so that there may be any suitable corresponding number of offsets (e.g., four offsets). In addition, in the embodiments of the present invention the offset for the write commands may change over time (e.g., if the partition boundaries are modified over time). When the offset of the write commands changes, the alignment zones are again shifted to account for the change in the offset.

FIG. 1D illustrates an example where an initial offset of three is detected for the write commands, and therefore the data chunks of the alignment zone are shifted right by three chunks. At some point a new offset of one is detected for the write commands, and therefore the data chunks of the alignment zone are shifted left by two chunks. Thereafter a new offset of zero is detected for the write commands, and therefore the data chunks of the alignment zone are shifted left again by one chunk. In the embodiments of the present invention, the pad chunks in the alignment zone enable the data chunks to be shifted right or left consecutively to accommodate any offset for the write commands that may be detected over time. The pad chunks also enable the data chunks to be shifted while maintaining a copy of the data chunks, thereby providing data protection during abnormal conditions, such as a power failure.

Figure 2:
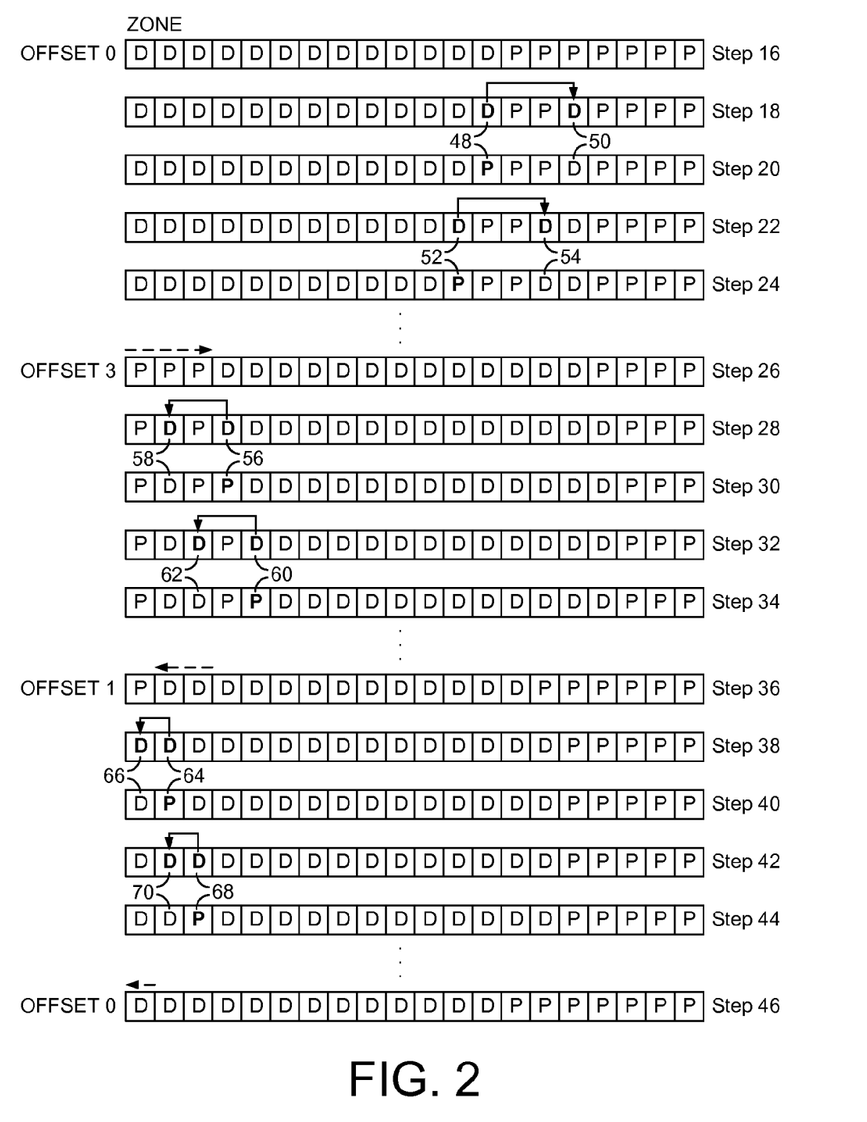
FIG. 2 illustrates in more detail the process of shifting the data chunks right by three chunks, then left by two chunks, then left by one chunk while maintaining a copy of the data chunks.

FIG. 2 shows further details of how the data chunks are shifted in an alignment zone for the example shown in FIG. 1D, including how a copy of the data chunks is maintained during the shifting operation. At step 16, the alignment zone begins with an offset of zero such that all of the pad chunks (seven in this example) are on the right side of the alignment zone. Step 18 shows the beginning of the shifting operation to align the alignment zone with an offset of three. The last data chunk 48 in the alignment zone is copied over pad chunk 50 (three chunks to the right). While copying data chunk 48 over pad chunk 50, data chunk 48 remains intact so that a copy of all the data chunks is maintained. The mapping information (LBA to PBA mapping) for accessing data chunk 48 also remains unchanged so that the original copy is used to service access requests (write/read) during the shift operation. After copying data chunk 48 over pad chunk 50 (step 20), the mapping information for data chunk 48 is changed to chunk 50, and chunk 48 is converted into a pad chunk. This process is repeated at steps 22 and 24 for data chunk 52 and pad chunk 54 and so on until all of the data chunks have been shifted right by three chunks as shown in step 26. After shifting the data chunks right by three chunks, there are three pad chunks on the left side of the alignment zone and four pad chunks on the right side of the alignment zone.

At step 28 a new offset of one is detected for the write commands, which means the data chunks need to be shifted left by two chunks. The shift procedure begins by copying the first data chunk 56 over pad chunk 58 (two pad chunks to the left). After copying data chunk 56 over pad chunk 58 (step 30), the mapping information (LBA to PBA mapping) for data chunk 56 is changed to chunk 58, and chunk 56 is converted into a pad chunk. This process is repeated at steps 32 and 34 for data chunk 60 and pad chunk 62 and so on until all of the data chunks have been shifted left by two chunks as shown in step 36. After shifting the data chunks left by two chunks, there is one pad chunk on the left side of the alignment zone and six pad chunks on the right side of the alignment zone.

At step 38 a new offset of zero is detected for the write commands, which means the data chunks need to be shifted left by one chunk. The shift procedure begins by copying the first data chunk 64 over pad chunk 66 (one pad chunk to the left). After copying data chunk 64 over pad chunk 66 (step 40), the mapping information (LBA to PBA mapping) for data chunk 64 is changed to chunk 66, and chunk 64 is converted into a pad chunk. This process is repeated at steps 42 and 44 for data chunk 68 and pad chunk 70 and so on until all of the data chunks have been shifted left by one chunk as shown in step 46. After shifting the data chunks left by one chunk, there are zero pad chunks on the left side of the alignment zone and seven pad chunks on the right side of the alignment zone.

In one embodiment of the present invention, the number of pad chunks in an alignment zone equals one less than the number of possible offsets that the data chunks may be shifted. In the example of FIGS. 1B and 1D, there are eight host blocks per sector and therefore there are eight possible offsets (0-7) and seven pad chunks to facilitate the offsets. In general, each sector is operable to store X host blocks, and an alignment zone comprises at least X−1 pad chunks. The control circuitry 6 is operable to shift the data chunks of an alignment zone by a number of chunks equal to or less than X−1 plus a corresponding offset. An alignment zone may comprise Y pad chunks at the beginning of the alignment zone and X−Y−1 pad chunks at the end of the alignment zone, where Y corresponds to a number of chunks the data chunks are shifted right in the alignment zone.

Figure 3A:
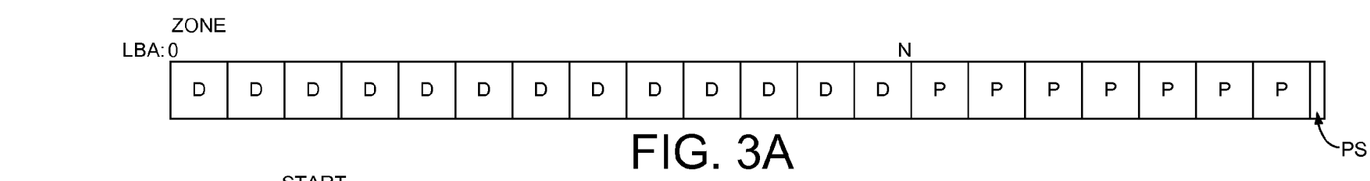
FIGS. 3A-3D illustrate an embodiment of the present invention wherein the data chunks are shifted right by seven chunks corresponding to an offset of seven host blocks.
Figure 3B:
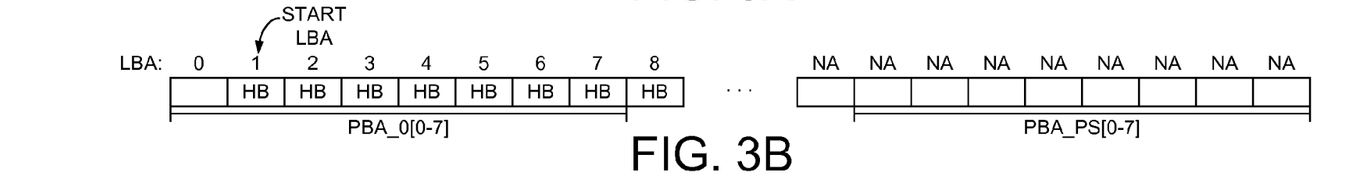
Figure 3C:
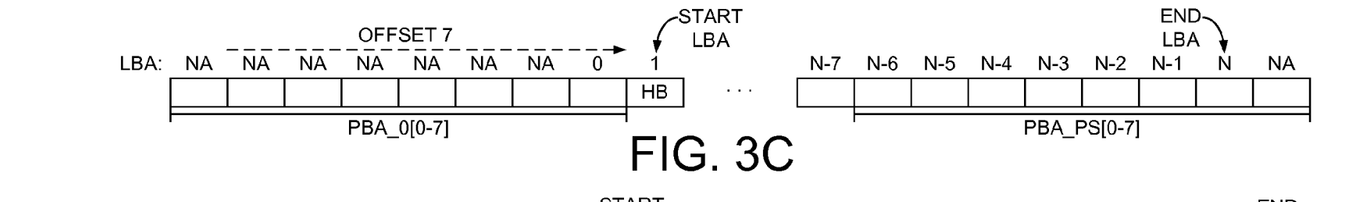

FIGS. 3A-3D illustrate an example embodiment wherein the offset detected for the write commands is seven meaning that the starting LBA of a write command is usually offset by seven host blocks (seven LBAs) relative to a sector as shown in FIG. 3B. In order to align subsequent write commands with a sector boundary, the LBA to PBA mapping of the alignment zone is shifted right by seven as shown in FIG. 3C meaning that the offset for the alignment zone is seven.

FIG. 3A shows the alignment zone prior to shifting the data chunks right by seven chunks. The alignment zone comprises a plurality of data chunks, each data chunk comprises a plurality of sectors, and each sector is accessed through LBAs 0 to N. In this example each sectors stores eight host blocks (accessed through eight LBAs) and therefore the alignment zone comprises at least seven pad chunks. The alignment zone also comprises an additional pad sector (PS) to facilitate shifting the LBA to PBA mapping. The pad sector (PS) is shown at the end of the alignment zone which corresponds to an offset of seven. If the offset is less than seven, the pad sector (PS) will be the first sector of the first pad chunk after performing the shift operation.

FIG. 3B shows further details of each sector accessed through a PBA (e.g., PBA_0), wherein each LBA is mapped to an eighth of the sector (e.g., PBA_0[0], PBA_0[1] . . . PBA_0[7] where PBA_0 represents the first physical sector of a chunk). An "NA" is shown in place of the LBA for the sectors of the pad chunks and the pad sector meaning there is no LBA yet assigned to these sectors. FIG. 3C shows the LBA to PBA mapping after shifting the data chunks by seven chunks and after shifting the LBA to PBA mapping by seven LBAs. In the example of FIG. 3C, LBA 1 represents the start of a write command (e.g., at the start of a partition) which is aligned with the boundary of sector PBA_1 of the first data chunk after shifting the data chunks. FIG. 3C also shows how the LBA sequence has been shifted into the sectors of the pad chunks as well as the pad sector (PS) (i.e., shifted by seven LBAs into the pad sector (PS) corresponding to the offset of seven).

Figure 3D:
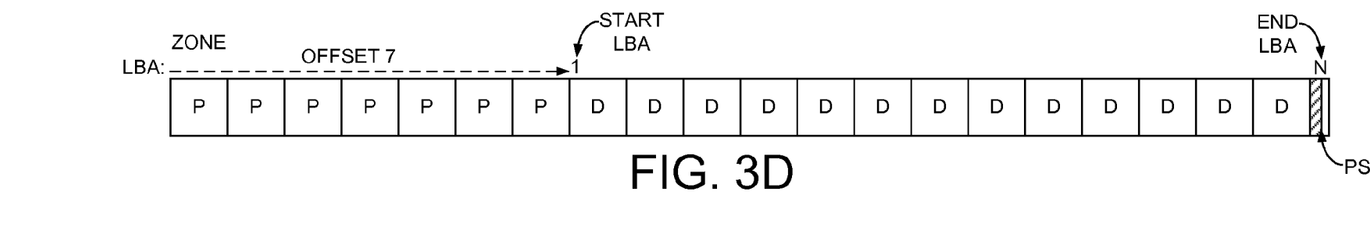

FIG. 3D shows the alignment zone after shifting the data chunks right by seven chunks, wherein the last data chunk extends into the pad sector (PS). With an offset of seven, all seven pad chunks end up on the left side of the alignment zone. If, for example, an alignment zone is shifted with an offset of four, the data chunks would be shifted right by four chunks leaving four pad chunks on the left side of the alignment zone. The last data chunk of the alignment zone would extend into the first sector of the adjacent pad chunk by four host blocks (similar to the host blocks extending into the pad sector (PS) as shown in FIG. 3C).

Including at least X−1 pad chunks in an alignment zone (where X is the number of host blocks stored in a sector) enables the data chunks of the alignment zone to be shifted left or right corresponding to any offset (e.g., offset 0-7) while maintaining at least one copy of the data chunks. In this manner, any change to the offset of write commands that may occur over time can be accounted for in a fail safe manner since there is always at least one copy of the data chunks. For example, the offset of write commands may change over time due to the boundaries of a partition map being modified over time. In the example of FIG. 1D, the offset of a partition map may initially be zero, and then change to an offset of three, and then change to an offset of two, and then change back to an offset of zero. Accordingly, the data chunks can be shifted right, and then shifted left, and then shifted left again as illustrated in FIG. 1D and FIG. 2 due to having at least X−1 pad chunks in the alignment zone.

Figure 4:
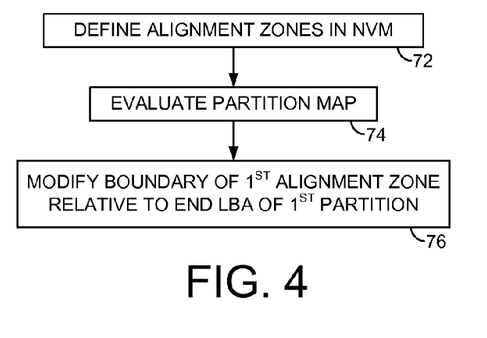
FIG. 4 is a flow diagram according to an embodiment of the present invention wherein boundaries of alignment zones are modified relative to partitions.

FIG. 4 is a flow diagram executed by the control circuitry 6 according to another embodiment of the present invention wherein a plurality of alignment zones are defined including a first alignment zone and a second alignment zone (step 72), wherein each alignment zone comprises a plurality of chunks including a plurality of data chunks and a plurality of pad chunks, and each chunk comprises a plurality of sectors. A partition map is evaluated that defines a plurality of partitions including a first partition and a second partition, and each partition defines a start LBA and an end LBA (step 74). A boundary of the first alignment zone is modified relative to the end LBA of the first partition (step 76).

Figure 5A:
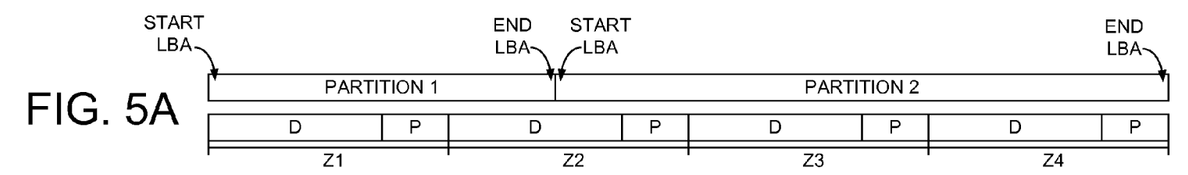
FIGS. 5A-5C illustrate an embodiment of the present invention wherein the end boundary of a first alignment zone and the beginning boundary of a second alignment zone are modified relative to first and second partitions.

FIG. 5A shows an example where four alignment zones are defined Z1-Z4 each comprising a plurality of data chunks and a plurality of pad chunks. FIG. 5A also shows an example where two partitions are defined by a partition map, where each partition defines a start LBA and an end LBA. In this example, each alignment zone initially has the same number of data chunks which are aligned with an offset of zero (the data chunks are all shifted to the left side of each alignment zone). FIG. 5A also shows how the number of data chunks in an alignment zone does not integer divide into the size of a partition which means at least one alignment zone will straddle a partition boundary. Accordingly, in an embodiment of the present invention the boundaries of the alignment zones as well as the number of data chunks within each alignment zone are modified so that the number of data chunks integer divides into each partition.

Figure 5B:
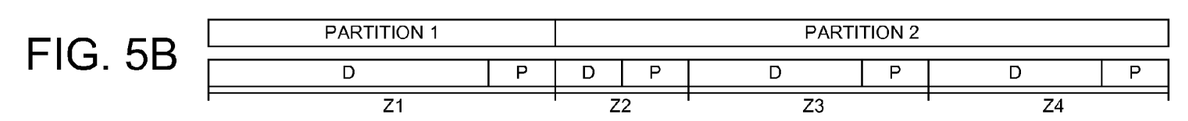

FIG. 5B shows an example of how the boundaries of the alignment zones may be modified by shifting the ending boundary of alignment zone Z1 and the beginning boundary of alignment zone Z2. To facilitate modifying the boundaries, a number of data chunks in alignment zone Z2 are reassigned to alignment zone Z1 as shown in FIG. 5B. Reassigning the data chunks may include copying data in the data chunks of alignment zone Z2 to alignment zone Z1, or the data chunks may be reassigned without copying data (e.g., if a data chunk in alignment zone Z2 is empty). After modifying the boundaries and reassigning the data chunks, the number of data chunks in alignment zone Z1 covers the LBAs of the first partition, and the number of data chunks in alignment zones Z2-Z4 cover the LBAs of the second partition. The boundaries of the alignment zones may be modified in any suitable manner to achieve a similar result, such as by modifying the boundaries so that alignment zones Z1-Z2 cover the first partition and alignment zones Z3-Z4 cover the second partition.

Figure 5C:
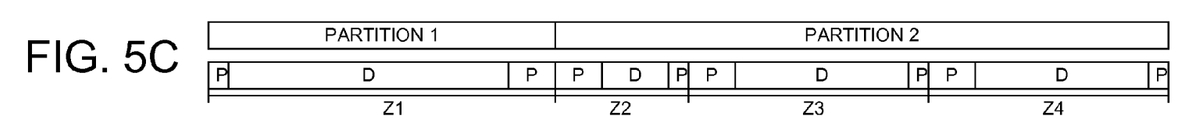

In one embodiment, the partitions may define a starting LBA that results in a different partition offset relative to the sectors. In the example of FIG. 5C, the first partition may have a partition offset of two, and the second partition may have a partition offset of six. Accordingly in this example embodiment, the data chunks in the first alignment zone Z1 are aligned relative to a first partition offset defined by the first partition, and the data chunks in the second alignment zone Z2 (and Z3-Z4) are aligned relative to a second partition offset defined by the second partition. Aligning the alignment zones relative to the partition offset is implemented by shifting the data chunks in each alignment zone as described above.

The flow diagrams disclosed herein may be carried out by a microprocessor executing code segments of a program stored on a computer readable medium. Any suitable computer readable storage medium capable of storing code segments may be employed, such as the data storage device being aligned, or a separate data storage device, such as a disk drive, or a flash memory, or a CD.

Figure 6:
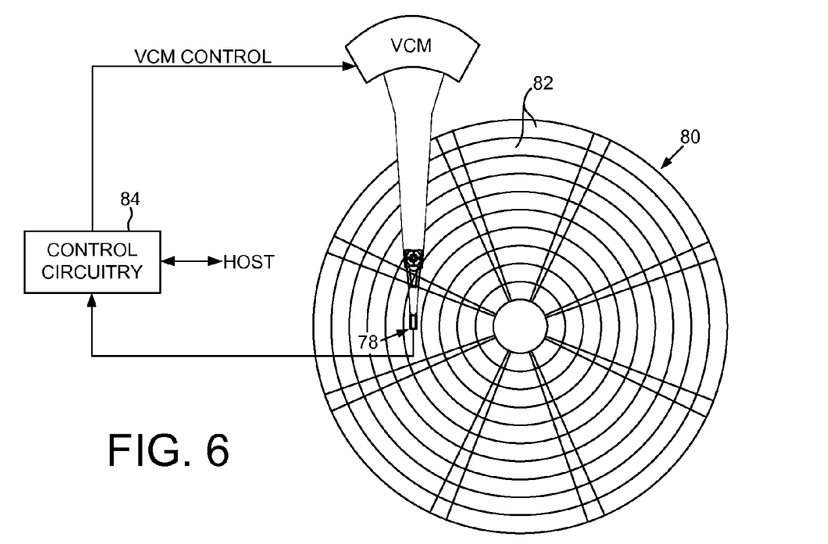
FIG. 6 illustrates an embodiment of the present invention wherein the data storage device comprises a disk drive.

The embodiments of the present invention may be used to align a partition of any suitable data storage device. FIG. 6 shows a data storage device in the form of a disk drive comprising a head 78 actuated over a disk 80 having a plurality of tracks 82. The disk drive further comprises control circuitry 84 for receiving access commands from a host (write/read commands) and for generating a control signal applied to a voice coil motor (VCM) to rotate an actuator arm about a pivot in order to position the head 78 radially over the disk 80 to access a target track. Each track is divided into a number of sectors, wherein each sector is capable of storing multiple host blocks.

Figure 7:
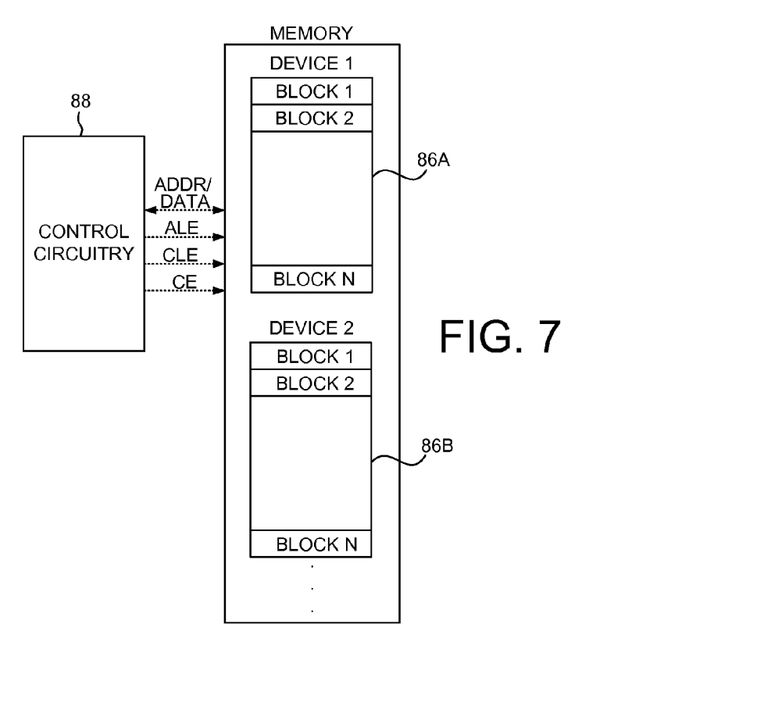
FIG. 7 illustrates an embodiment of the present invention wherein the data storage device comprises a solid state drive.

FIG. 7 shows a data storage device in the form of a solid state drive comprising a plurality of non-volatile semiconductor memories 86A, 86B, etc., such as flash memories, and control circuitry 88 for accessing the non-volatile semiconductor memories. In one embodiment, a sector of the solid state drive corresponds to a page of memory in a memory array, wherein each page stores a plurality of host blocks. A hybrid data storage device may also be employed comprising components of a disk drive shown in FIG. 6 combined with the non-volatile semiconductor memories shown in FIG. 7.

What is claimed is:

1. A data storage device comprising a non-volatile memory comprising a plurality of sectors, and control circuitry operable to define at least one alignment zone comprising a plurality of chunks including a plurality of data chunks and a plurality of pad chunks, wherein:
   each chunk comprises a plurality of sectors;
   each sector is operable to store X host blocks, where X is an integer greater than one;
   the alignment zone comprises at least X−1 pad chunks; and
   the control circuitry is operable to:
      shift the data chunks of the alignment zone by a non-zero integer number of chunks equal to or less than X−1 plus a corresponding offset;
      first shift the data chunks right by N1 chunks plus a first offset while maintaining at least one copy of the data chunks;
      after first shifting the data chunks right by N1 chunks, second shift the data chunks left by N2 chunks plus a second offset while maintaining at least one copy of the data chunks; and after second shifting the data chunks left by N2 chunks, third shift the data chunks left by N3 chunks plus a third offset while maintaining at least one copy of the data chunks, wherein the first, second, and third offsets represent different fractions of a sector.

2. The data storage device as recited in claim 1, wherein the first, second, and third shifts are consecutive.

3. The data storage device as recited in claim 2, wherein:
the alignment zone comprises Y pad chunks at the beginning of the alignment zone and X−Y−1 pad chunks at the end of the alignment zone, where Y is an integer greater than zero; and
Y corresponds to a number of chunks the data chunks are shifted right in the alignment zone.

4. The data storage device as recited in claim 2, wherein the control circuitry is further operable to:
map a plurality of logical block addresses (LBAs) to the sectors storing the data chunks of the alignment zone; and
after shifting the data chunks right by N1 chunks plus the first offset, remap the LBAs to the corresponding sectors.

5. The data storage device as recited in claim 1, wherein X equals eight.

6. The data storage device as recited in claim 5, wherein the control circuitry is operable to:
shift the data chunks of the alignment zone right by one chunk plus one-eighth of a sector;
shift the data chunks of the alignment zone right by two chunks plus two-eighths of a sector;
shift the data chunks of the alignment zone right by three chunks plus three-eighths of a sector;
shift the data chunks of the alignment zone right by four chunks plus four-eighths of a sector;
shift the data chunks of the alignment zone right by five chunks plus five-eighths of a sector;
shift the data chunks of the alignment zone right by six chunks plus six-eighths of a sector; and
shift the data chunks of the alignment zone right by seven chunks plus seven-eighths of a sector.

7. A data storage device comprising a non-volatile memory comprising a plurality of sectors, and control circuitry operable to:
define a plurality of alignment zones including a first alignment zone and a second alignment zone, wherein each alignment zone comprises a plurality of chunks including a plurality of data chunks and a constant number of pad chunks, and each chunk comprises a plurality of sectors;
evaluate a partition map that defines a plurality of partitions including a first partition and a second partition, wherein each partition defines a start logical block address (LBA) and an end LBA and at least one of the partitions comprises more than one of the alignment zones; and
modify a boundary of the first alignment zone relative to the end LBA of the first partition.

8. The data storage device as recited in claim 7, wherein the control circuitry is further operable to modify the boundary of the first alignment zone by changing the number of data chunks in the first alignment zone.

9. The data storage device as recited in claim 8, wherein the control circuitry is further operable to modify the boundary of the first alignment zone by reassigning a plurality of data chunks from the second alignment zone to the first alignment zone.

10. The data storage device as recited in claim 7, wherein the control circuitry is further operable to:
align the data chunks in the first alignment zone relative to a first partition offset defined by the first partition; and
align the data chunks in the second alignment zone relative to a second partition offset defined by the second partition,
wherein the first and second partition offsets represent different fractions of a sector.

11. A method of operating a data storage device, the data storage device comprising a non-volatile memory comprising a plurality of sectors, the method comprising defining at least one alignment zone comprising a plurality of chunks including a plurality of data chunks and a plurality of pad chunks, wherein:
each chunk comprises a plurality of sectors;
each sector is operable to store X host blocks, where X is an integer greater than one;
the alignment zone comprises at least X−1 pad chunks; and
the method further comprises:
shifting the data chunks of the alignment zone by a non-zero integer number of chunks equal to or less than X−1 plus a corresponding offset;
first shifting the data chunks right by N1 chunks plus a first offset while maintaining at least one copy of the data chunks;
after first shifting the data chunks right by N1 chunks, second shifting the data chunks left by N2 chunks plus a second offset while maintaining at least one copy of the data chunks; and
after second shifting the data chunks left by N2 chunks, third shifting the data chunks left by N3 chunks plus a third offset while maintaining at least one copy of the data chunks,
wherein the first, second, and third offsets represent different fractions of a sector.

12. The method as recited in claim 11, wherein the first, second, and third shifting are consecutive.

13. The method as recited in claim 12, wherein:
the alignment zone comprises Y pad chunks at the beginning of the alignment zone and X−Y−1 pad chunks at the end of the alignment zone, where Y is an integer greater than zero; and
Y corresponds to a number of chunks the data chunks are shifted right in the alignment zone.

14. The method as recited in claim 12, further comprising:
mapping a plurality of logical block addresses (LBAs) to the sectors storing the data chunks of the alignment zone; and
after shifting the data chunks right by N1 chunks plus the first offset, remapping the LBAs to the corresponding sectors.

15. The method as recited in claim 11, wherein X equals eight.

16. The method as recited in claim 15, further comprising:
shifting the data chunks of the alignment zone right by one chunk plus one-eighth of a sector;
shifting the data chunks of the alignment zone right by two chunks plus two-eighths of a sector;
shifting the data chunks of the alignment zone right by three chunks plus three-eighths of a sector;
shifting the data chunks of the alignment zone right by four chunks plus four-eighths of a sector;
shifting the data chunks of the alignment zone right by five chunks plus five-eighths of a sector;
shifting the data chunks of the alignment zone right by six chunks plus six-eighths of a sector; and shifting the data chunks of the alignment zone right by seven chunks plus seven-eighths of a sector.

17. A method of operating a data storage device, the data storage device comprising a non-volatile memory comprising a plurality of sectors, the method comprising:

defining a plurality of alignment zones including a first alignment zone and a second alignment zone, wherein each alignment zone comprises a plurality of chunks including a plurality of data chunks and a constant number of pad chunks, and each chunk comprises a plurality of sectors;

evaluating a partition map that defines a plurality of partitions including a first partition wherein a second partition, and each partition defines a start logical block address (LBA) and an end LBA and at least one of the partitions comprises more than one of the alignment zones; and modifying a boundary of the first alignment zone relative to the end LBA of the first partition.

18. The method as recited in claim 17, further comprising modifying the boundary of the first alignment zone by changing the number of data chunks in the first alignment zone.

19. The method as recited in claim 18, further comprising modifying the boundary of the first alignment zone by reassigning a plurality of data chunks from the second alignment zone to the first alignment zone.

20. The method as recited in claim 17, further comprising:

aligning the data chunks in the first alignment zone relative to a first partition offset defined by the first partition; and aligning the data chunks in the second alignment zone relative to a second partition offset defined by the second partition, wherein the first and second partition offsets represent different fractions of a sector.

* * * * *